WILLIAM HADWIN.
Improvement in Baling Short Cut Hay and Straw.
No. 123,824.
Patented Feb. 20, 1872.
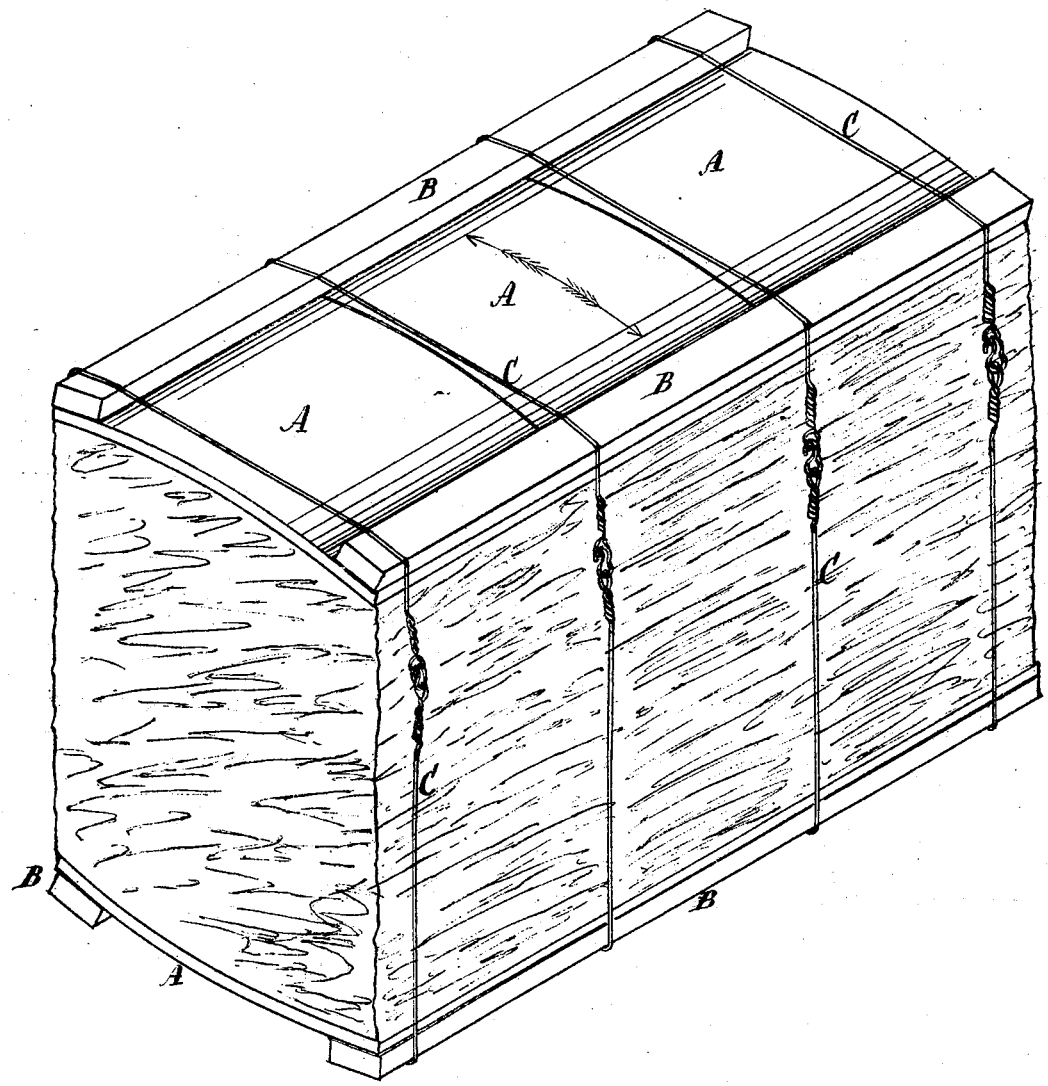
Witnesses.
Fred. A. Hatch
Arch. Baine
Inventor.
William Hadwin,
By Burke Fraser & Osgood,
attys.

No. 123,824

UNITED STATES PATENT OFFICE.

WILLIAM HADWIN, OF ROCHESTER, NEW YORK.

IMPROVEMENT IN BALING SHORT-CUT HAY AND STRAW.

Specification forming part of Letters Patent No. 123,824, dated February 20, 1872.

Specification describing a certain Improvement in Baling Short-Cut Hay and Straw, invented by WILLIAM HADWIN, of the city of Rochester, in the county of Monroe and State of New York.

This invention is an improvement on that patented to me February 28, 1871; and consists in arranging the wooden strips to run crosswise of the bale to shed water more readily, and in combining therewith longitudinal binding-slats at the edges, which cross the covering-boards at right angles, the whole being held by wire, as hereinafter described.

The drawing represents a perspective view.

My present invention differs from my former one in making the boards or veneers A A, which form the covering of the bale, to run crosswise instead of lengthwise, and in combining therewith the edge-slats or binders B B, crossing the boards at right angles and lengthwise of the bale, and the whole held by wire bands C C situated at suitable distances apart. These bands have hooks and eyes, which connect in the usual manner.

By this special arrangement I gain the following advantages: The covering-strips, lying crosswise, form a better shed to rain, and do not require such tight joints, as the water will follow the natural curve and run off unimpeded without crossing joints, as it must do where the strips lie crosswise. Therefore, it is a more perfect water-proof covering, which is of much importance, as the bales are usually much exposed. Another great advantage is that greater strength is insured; and, in turning the bale over, or in the rough handling of transportation, there is much less danger of splitting or breaking of the wood, or of disarranging and opening the joints. A distinguishing feature of the invention is the edge-binders B B, crossing the covering-strips at right angles, and thus binding them together, and serving to receive the strain at that point where contact occurs in turning the bales over, and also forming the bearings for the wires.

Claim.

I claim—

The covering-strips A A, lying crosswise of the bale, when combined with the longitudinal edge-binders B B and wire bands C C, in the manner and for the purpose specified.

In witness whereof I have hereunto signed my name in the presence of two subscribing witnesses.

WILLIAM HADWIN.

Witnesses:
R. F. OSGOOD,
ARCHD. BAINE.